United States Patent [19]

Gupta

[11] Patent Number: 4,745,622
[45] Date of Patent: May 17, 1988

[54] EQUALIZER FOR DIGITAL TRANSMISSION SYSTEMS

[75] Inventor: Dev V. Gupta, Flemington, N.J.

[73] Assignee: Integrated Network Corporation, Bridgewater, N.J.

[21] Appl. No.: 891,462

[22] Filed: Jul. 29, 1986

[51] Int. Cl.[4] ............................ H04B 1/58; H03F 3/04
[52] U.S. Cl. .................................... 375/14; 178/69 N; 330/294; 330/303; 333/18; 370/24
[58] Field of Search ................ 178/63 E, 69 R, 69 M, 178/69 N; 370/32, 24; 455/69, 116; 375/11, 12, 14, 60; 333/18, 28; 330/294, 302, 303, 278, 284; 307/350, 362; 379/394, 400

[56] References Cited

U.S. PATENT DOCUMENTS

| | | | |
|---|---|---|---|
| 3,075,151 | 1/1963 | Murray | 330/303 |
| 3,151,295 | 9/1964 | Haviland | 455/69 |
| 3,365,586 | 1/1968 | Billings | 307/362 |
| 3,369,186 | 2/1968 | Lejon | 330/294 |
| 3,568,100 | 3/1971 | Tarbox | 333/18 |
| 3,725,799 | 4/1973 | Cubbison, Jr. | 330/303 |
| 3,824,501 | 7/1974 | Harris | 333/18 |
| 4,003,006 | 1/1977 | Mandeville et al. | 375/12 |
| 4,021,738 | 5/1977 | Gitlin et al. | 375/14 |
| 4,097,824 | 6/1978 | Ishizuka et al. | 330/294 |
| 4,204,176 | 5/1980 | Takasaki et al. | 330/294 |
| 4,227,250 | 10/1980 | Wyner | 375/37 |
| 4,251,782 | 2/1981 | Bynum | 375/12 |
| 4,273,963 | 6/1981 | Seidel | 379/398 |
| 4,436,956 | 3/1984 | Schreiber | 330/294 |
| 4,493,092 | 1/1985 | Adams | 375/36 |
| 4,507,793 | 3/1985 | Adams | 375/36 |
| 4,535,443 | 8/1985 | Korevaar | 370/24 |
| 4,550,415 | 10/1985 | Debus, Jr. et al. | 375/14 |

Primary Examiner—Benedict V. Safourek
Attorney, Agent, or Firm—Hamilton, Brook, Smith & Reynolds

[57] ABSTRACT

A post-equalizer and pre-equalizer circuit for use in communicating between nodes in a Pulse Amplitude Modulated (PAM) digital or analog communication system is described. The post-equalizer circuit comprises a first variable zero circuit, a second variable zero circuit, and a gain shaper circuit wherein the gain and frequency location of the zeros in the zero circuits combined with the gain of the gain shaping circuit are simultaneously controlled by a control circuit which generates a control voltage which is a monotonically increasing function of cable loss. In the case of a PAM digital communication system, the control voltage generates a signal equal to the difference between the equalized signal and the original transmitted signal which is used to vary the resistance of voltage variable resistors in the form of FET's in each of the zero circuits and gain shaper circuits. In the case of an analog system, the control voltage is derived from the sealing current that is determined by the DC resistance of the cable to be equalized. If the cable loss is above a predetermined value, a pre-equalizer circuit is switched into the transmit path of the communication system and provides a gain, zero and pole at predetermined frequencies which pre-compensates for the extra loss incurred in transmission over length greater than can be equalized by the post-equalizer. Additionally, a bi-quad ACE circuit is described which provides a hyperbolic relationship between the zero frequency location and circuit gain utilizing a cascode amplifier and emitter follower circuit with a feedback loop through a voltage variable resistor.

21 Claims, 4 Drawing Sheets

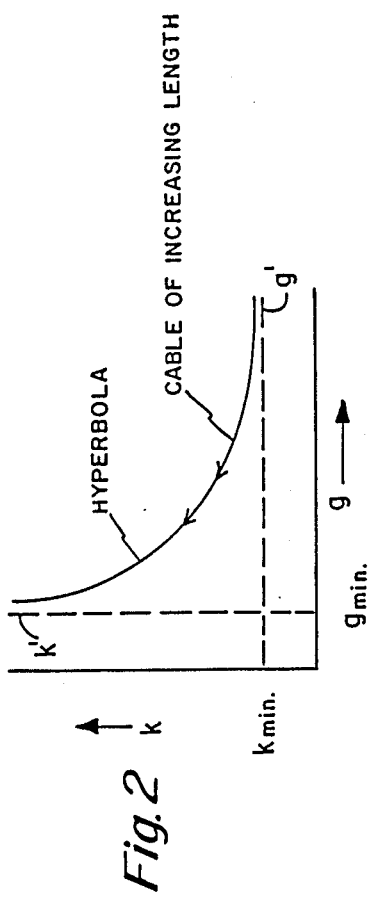
Fig. 2
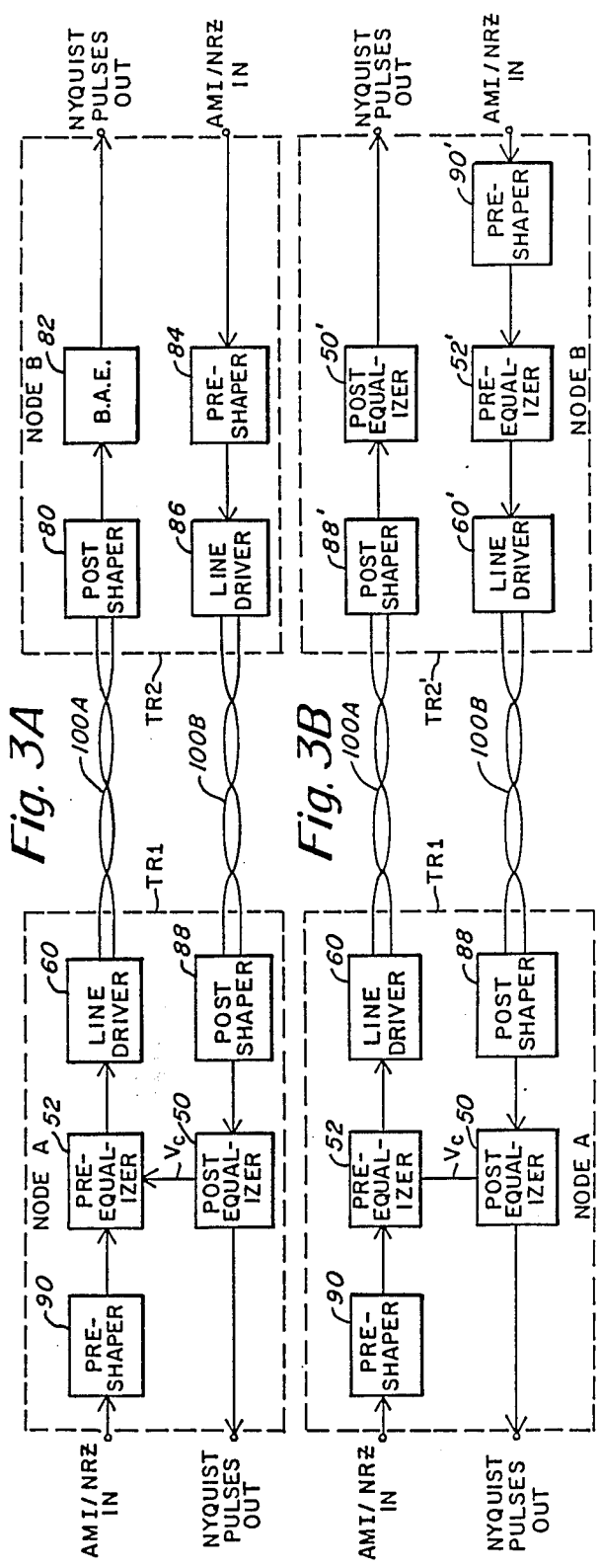
Fig. 3A
Fig. 3B

EQUALIZER FOR DIGITAL TRANSMISSION SYSTEMS

TECHNICAL FIELD

This invention is in the field of digital data or analog voice transmission systems and, more particularly, relates to apparatus and methods for equalizing or currecting for distortion caused by the frequency-dependent transmission nature of cables used in such systems.

BACKGROUND ART

In Pulse Amplitude Modulated (PAM) digital transmission systems, digital pulses of substantially uniform amplitude and duration are transmitted between terminal facilities by way of regenerative repeaters spaced at intervals along the transmission medium. Each repeater first distinguishes between the presence or absence of a pulse and then regenerates each detected pulse with substantially its original amplitude and duration. Because of the frequency-dependent nature of the transfer characteristics of the transmission media, such as a wire cable, it is necessary to provide equalization for the preceding section of cable at each repeater point.

Tarbox, in U.S. Pat. No. 3,568,100, issued Mar. 2, 1971, teaches that the transfer characteristic of a length of cable connecting adjacent regenerator repeaters in a digital transmission system can be approximated by the combination of flat loss and a single attenuation pole. The magnitude of the flat loss and the frequency of the pole are both dependent upon the length and the gauge of the cable. For a given gauge of cable, the flat loss increases with length and the frequency of the pole decreases. For a given length of cable, the flat loss increases and the frequency of the pole decreases as the cable gauge becomes finer.

In the Tarbox equalizer system, the peak signal level at the output of the equalizer is detected and the gain, i.e., amplitude response of the equalizer is varied along with the frequency location of a simple real zero of the equalizer's frequency response. The gain and zero location is varied in accordance with a complex non-linear relationship, which is a function of the detected peak voltage level. For very short cable lengths, i.e., below 10 db loss, the non-linear relationship given by Tarbox does not provide adequate composition. Therefore, a manual switch must be provided for adjusting compensation parameters when the loss is less than 10 db.

A bi-quad automatic cable equalizer (Bi-Quad ACE) is U.S. Pat. No. 3,824,501 to Harris, issued July 16, 1974, wherein the "eye openings" of signals emanating out of transmission cables is maximized. Equalization is achieved by monitoring the equalizer's peak output signal, and adjusting the gain k, of the equalizer to maintain a constant output signal level, and by altering the frequency location of a simple real zero, g, in the equalizer's transfer response in accordance with the relation $1/k = K_1 g + K_2$, where $K_1$ and $K_2$ are equalizer constants.

The "eye opening" defines a decision region, within each transmission clock period, that is best suited for performing the signal regeneration task. A more thorough treatment of the "eye diagram" subject is found in the book entitled *Data Transmission*, by W. R. bennett and J. R. Davey, p. 119, McGraw-Hill, 1965.

It was determined by C. Harris and W. Farmer, at Bell Telephone Laboratories, that good eye openings, i.e., greater than 70% over a length (l) of cable involving less than 34 db loss, could be achieved using an equalizer which compensated for a cable transfer function T(s) having a loss K(l) and a signal pole P(l) with a hyberbolic relationship between K(l) and P(l).

SUMMARY OF THE INVENTION

Automatic equalizers of the Bi-Quad type described above in the Harris patent do not provide satisfactory compensation for very short (less than 10 db loss) or very long cables (over 34 db loss). As an example of loss related to specific cable length and gauge size, cables of #26 gauge and length 13,000 feet exhibit about 34 db loss.

A particular need exists for an automatic equalizer, of relatively simple circuit implementation, capable of compensating for cable transfer characteristics in cables of 26 gauge of over 13,000 feet, since a very large number of presently installed telephone cable lengths between central offices and subscribers exceed this length. In connecting these cables for use in 4-wire full-duplex PAM signalling, it would be highly desirable to avoid the requirement of repeaters. The apparatus and method of the present invention provides satisfactory post equalization of the transfer characteristic of cables of up to 52 db loss (21 K ft. of #26 gauge cable). This length is beyond the limit of non-loaded cable even for voice telephone applications.

In addition, the apparatus of the invention may be interfaced with standard Bi Quad ACE type equalizers at the receiving end of the circuit. To accomplish this, a pre-equalizer is provided in the transmit path, in accordance with the invention. The pre-equalizer shapes the spectrum of the transmitted signal at the transmitting end so that the receiving end perceives no more than 34 db of loss, even though the cable may actually have much more loss. With this pre-equalization circuit, the industry standard Bi-Quad ACE type equalizer is capable of properly interfacing with the apparatus of the present invention, even over an extended length of cable.

The post-equalizer of the invention, in general, comprises a first variable zero circuit, a second variable zero circuit, and a gain shaper circuit. The received signal is coupled to the input of the post-equalizer. The gain and the frequency location of the zeros in the zero circuits combined with the gain of the gain shaping circuit are simultaneously controlled by a control circuit which generates a control voltage $V_c$.

The control voltage circuit is responsive to the amplitude level of the post-equalized input signal and generates a control voltage $V_c$ equal to the difference between the amplitude of the equalized signal and the original transmitted signal. This voltage $V_c$ is used to vary the resistance of voltage variable resistors in each of the zero circuits and the gain shaper circuits.

In each of the real zero circuits, Field Effect Transistors (FET's) are located in the feedback path of amplifier inverter stages. The transfer characteristic T(s) of the zero circuits is adjusted by the FET's, such that the relationship between the gain (k) and the frequency location of the zero's (g) approximates a hyperbolic function for mid-length cable parameter, i.e., 10 to 30 db loss. For short cable lengths, the two simultaneous hyperbolic compensation functions are insufficient. Therefore, the gain shaper automatically reduces the overall gain for short cables, i.e., low loss signals, by utilizing $V_c$ to change the impedance of an FET coupled in series with an operational amplifier.

The post-equalizer circuit derives, from the received signal, a signal proportional to cable loss. If the cable loss is above a predetermined value, i.e., 34 db, the pre-equalizer circuit is switched into the transmit path and provides a fixed zero and fixed pole at predetermined frequencies and a fixed gain at a predetermined value for the transmit signal, thereby providing the excess gain versus frequency compensation needed to make the longest cable length seem to appear to be the equivalent of a cable having only 34 db loss.

BRIEF DESCRIPTION OF THE DRAWINGS

FIG. 2 is a plot of gain "k" versus zero location "g" for the first zero circuit.

FIG. 3A is a block diagram of a first embodiment of a communication system.

FIG. 3B is a block diagram of a second embodiment of a communication system.

BEST MODE OF CARRYING OUT THE INVENTION

Figure 1:
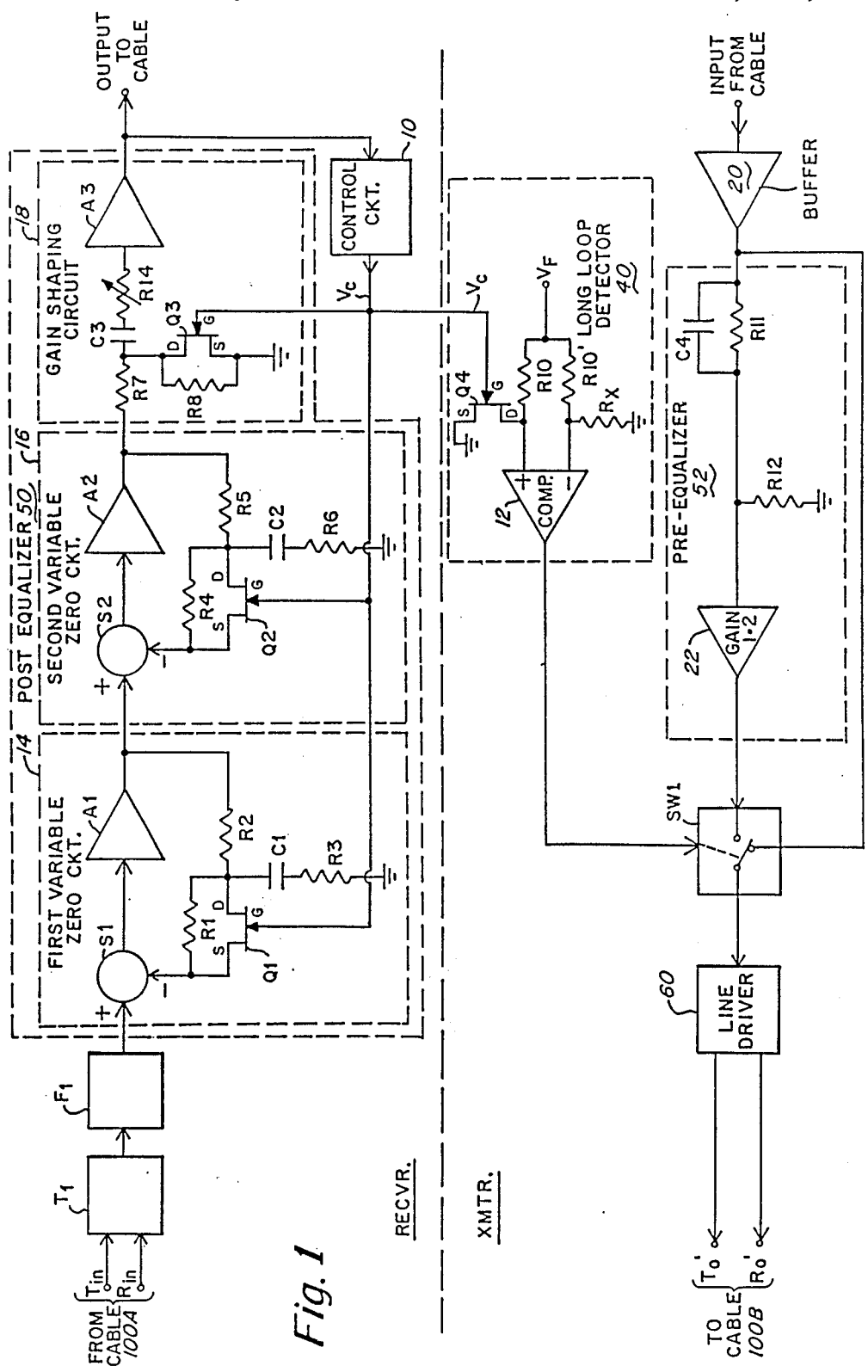
FIG. 1 is a block diagram and schematic of a first embodiment of the invention.

A transceiver, in accordance with the invention, will now be described, in detail, in connection with the partial block diagram of FIG. 1. FIG. 1 is divided by dotted lines into a receiver portion labelled RCVR and a transmitter portion labelled XTMR. Typically, the input signal across the tip and ring lines $T_{in}$ and $R_{in}$ comprises non-return-to-zero (NRZ) Alternate Mark Inversion (AMI) pulses which have been attenuated by the cable (not shown) and are coupled from the tip and ring lines of the cable to transformer $T_1$.

Transformer $T_1$ isolates the receiver from the harsh external environment of the cable, which may be subjected to power crossings, lightning or other types of electrical discharges. The filter $F_1$ provides two complex poles, in accordance with the transmission rules for shaping Nyquist pulses. Typically, this involves a Butterworth filter, which performs the pre-shaping function for the received signal before the signal is applied to the pre-equalizer circuit. The post-equalizer comprises a first variable zero circuit, shown in dotted lines 14, a second variable zero circuit 16, a gain shaping circuit 18 and a control circuit 10.

It should be noted that while the circuits 14, 16 and 18 are shown in a particular sequence, since these circuits are linear circuits, the order of the sequence is not critical.

The first variable zero circuit 14 produces a hyperbolic relationship between the circuit gain ($k_1$) and the frequency location of a first variable zero ($g_1$). The first variable zero circuit 14 comprises a summing node $S_1$ coupled to an amplifier inverter $A_1$. The output of the inverter is fed back to the summing node $S_1$ via a voltage controlled field effect transistor $Q_1$ and an R/C network comprising resistor $R_2$, capacitor $C_1$ and resistor $R_3$.

The FET $Q_1$ functions as a variable resistor $R_v$ which controls the gain $k_1$ of the amplifier $A_1$ in accordance with the following equation:

$$k_1 = (R_2 + R_v)/R_1;$$

which can be rewritten as:

$$k_1 = R_2/R_1[1 + R_v/R_2].$$

Let $\alpha$ be equal to $R_v/R_2$ then:

$$k_1 = R_2/R_1(1+\alpha);$$

The minimum gain of the circuit $k_{min}$ is $R_2/R_1$ since that would be the gain when $R_v = 0$; then:

$$k_1 = k_{min}(1+\alpha) \qquad \text{Equation 1}$$

The frequency location $g_1$ of the first zero circuit is likewise determined by the setting of $R_v$, i.e., the voltage on FET $Q_1$, as follows:

$$g_1 = \frac{1}{2\pi \left(\frac{R_2 R_v}{R_2 + R_v}\right) C_1} \qquad \text{Equation 2}$$

The above assumes that stabilizing resistors $R_3$ has a relatively low impedance. The function of $R_3$ is to create a pole with capacitor $C_1$ which is equal to $\frac{1}{2}R_3 C_1$ and is outside of the bandwidth of the received signal. From the viewpoint of the signal; $R_s$ has no effect other than to keep the circuit stable so as to avoid parasitic oscillations.

The zero-frequency location of Equation 2 can be similarly rewritten as in the gain Equation 1, as follows:

$$g_1 = \frac{1}{2\pi R_2 C_1}\left[\frac{R_v + R_2}{R_v}\right]; \qquad \text{Equation 3}$$

Since $g_{min} = 1/(2\pi R_2 C_1)$ and $\alpha = R_v/R_2$, then:

$$g_1 = g_{min}[1 + 1/\alpha] \qquad \text{Equation 4}$$

By combining Equations 1 and 4 and eliminating $\alpha$ therefrom, it can be shown that:

$$(k_1 - k_{min})(g_1 - g_{min}) = k_{min} \cdot g_{min} \qquad \text{Equation 5}$$

A plot of gain $k_1$ versus zero-frequency location $g_1$, in accordance with Equation 5, is shown in FIG. 2; from which it can be seen that Equation 5 reduces to the classic hyperbolic relationship wherein the product of two variable, $k' g'$, is equal to a constant, $k'_{min} \cdot g'_{min}$; wherein $k' = k_1 - k_{min}$ and $g' = g_1 - g_{min}$; and $k' \cdot g' = k_{min} \cdot g_{min}$.

The second zero circuit 16 is substantially identical to the first zero circuit and, therefore, need not be described herein except to point out that the particular location of the second zero-frequency location $g_2$ is determined, as in the first zero circuit, by the particular circuit parameter values set forth in Table I below for a 56 kilobits/sec. transmission speed. These values were determined using analytical cable models simulated by a computer. Values for other data speeds can be calculated in the same fashion.

TABLE I

| Length (kft) | Loss at Nyquist Freq (db) | Gain | First Zero (Hz) | Second Zero (Hz) |
| --- | --- | --- | --- | --- |
| 1 | 2.421 | 1.309 | 265258.48 | 358267.88 |
| 2 | 4.578 | 1.618 | 95578.05 | 428144.3 |
| 3 | 6.784 | 1.927 | 58144.04 | 176511.27 |
| 4 | 9.135 | 2.237 | 38707.24 | 148871.78 |
| 5 | 11.586 | 2.546 | 27527.44 | 163134.13 |
| 6 | 14.066 | 2.856 | 19655.44 | 2307746.67 |
| 7 | 16.538 | 3.2 | 15434.05 | 431309.74 |
| 8 | 18.992 | 3.474 | 12366.34 | 341068.88 |
| 9 | 21.437 | 3.784 | 9549.30 | 488605.52 |
| 10 | 23.879 | 4.094 | 7659.33 | 689140.74 |
| 11 | 26.322 | 4.403 | 6277.06 | 128557.22 |
| 12 | 28.767 | 4.713 | 5289.89 | 75300.41 |
| 13 | 31.213 | 5.069 | 4462.38 | 57341.58 |
| 14 | 33.660 | 5.330 | 3792.92 | 43957.54 |
| 15 | 36.106 | 5.640 | 3243.44 | 35858.35 |
| 16 | 38.552 | 5.955707 | 3013.18 | 25810.70 |
| 17 | 40.998 | 6.25376805 | 2669.50 | 21289.59 |
| 18 | 43.443 | 6.575 | 2221.84 | 19492.04 |
| 19 | 45.889 | 6.885 | 1915.07 | 17022.71 |
| 20 | 48.335 | 7.195 | 1645.77 | 14884.17 |

The gain shaper circuit 18 receives the output signal from second variable circuit 16 which is coupled to resistor $R_7$, capacitor $C_3$, variable resistor $R_{14}$ and inverter amplifier $A_3$. The gain of gain shaper circuit 18 is controlled by the impedance $R_{Q3}$ of FET $Q_3$. This, in turn, is controlled by the voltage $V_c$ from control circuit 10 on the gate electrode G of $Q_3$.

FET $Q_3$ is connected in parallel across resistor $R_8$ and connected between ground and the junction between input impedance $R_7$ and coupling capacitor $C_3$. When $Q_3$ has a low impedance relative to $R_8$, the gain of the circuit 18 is reduced since more of the input signal is passed to ground through the low impedance path through $R_8$ and $R_{Q3}$ in parallel. The effect of this is to reduce the gain when the cable length l is relatively short. When the cable length is short, $V_c$ will be low and the low voltage on gate electrode G of $Q_3$ causes the impedance $R_{Q3}$ of the FET $Q_3$ to be low.

Conversely, if the cable length is long, the voltage $V_c$ will be made high, the impedance $R_{Q3}$ will be much greater than $R_8$ and the gain G of the gain shaping circuit is maximized; since $R_8$ in parallel with $R_{Q3}$ will essentially equal $R_8$.

The overall transfer function $T_{ov}(s)$ of the three circuits, 15, 16 and 18, is the product of $T_{z1}(s)$, $T_{z2}(s)$ and G wherein $T_{z1}(s)$ and $T_{z2}(s)$ are the transfer functions of the first and second zero circuits, respectively, and G is the gain of the gain shaper circuit.

$T_{z1}(s)$ for a given cable length l is equal to $$k_1 \left[ 1 + \frac{\delta}{g_1(l)} \right]$$

and $T_{z2}(s)$ equals:

$$k_1 \left[ 1 + \frac{\delta}{g_2(l)} \right]$$

wherein $\delta$=the Laplace variable; and where:

$$(k_1 - k_{min})(g_1 - g_{1min}) = k_{1min}g_{1min}$$

and $$(k_2 - k_{2min})(g_1 - g_2\text{min}) = k_{2min}g_{2min};$$

from Equation 5.

Figure 5:
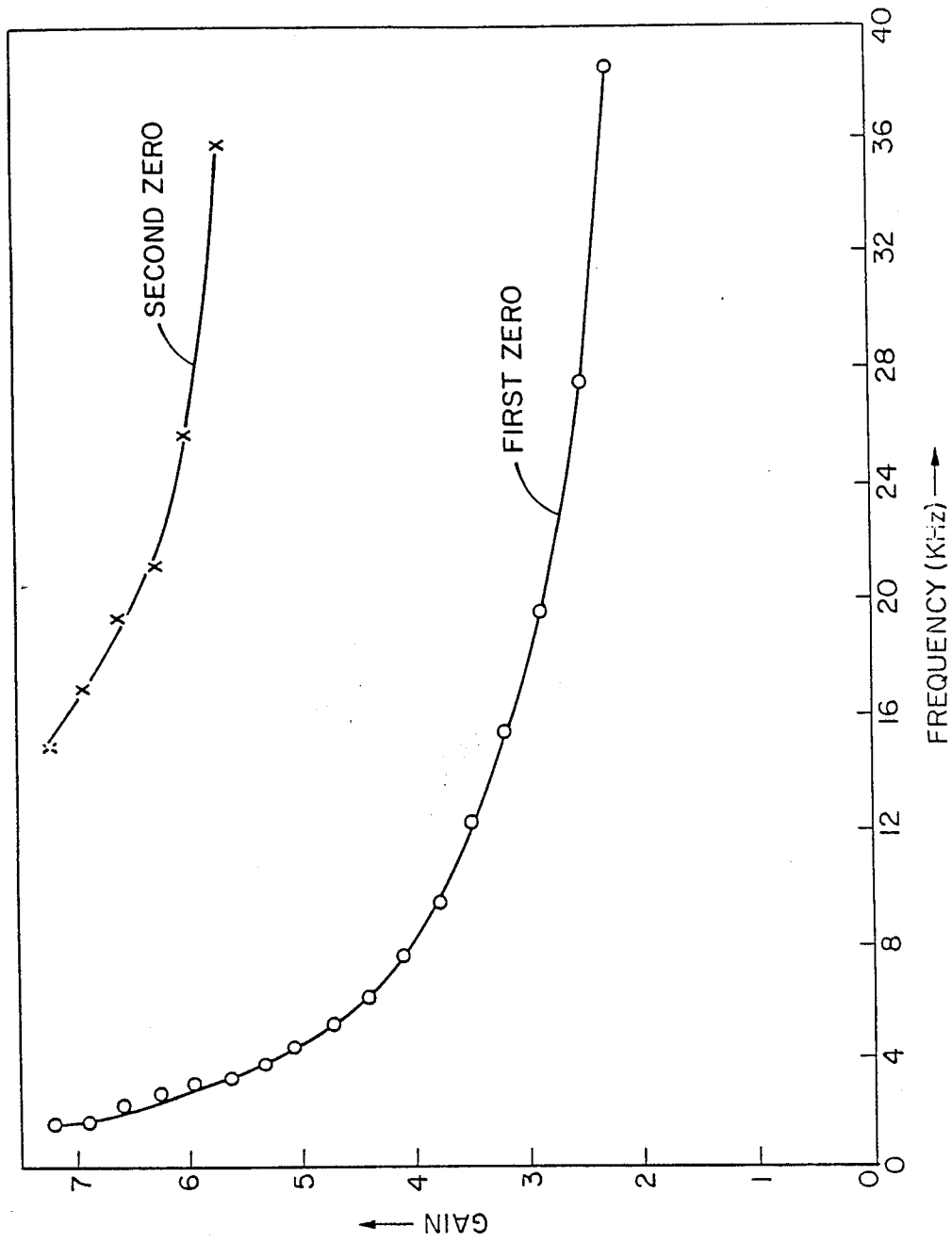
FIG. 5 is a gain versus zeroes plot for optimum equalization at 56 kilobits/sec. data speed.

Thus, the gain and zeroes move in a hyperbolic fashion. Also, note from Table I and FIG. 5, that the second zero $g_2$ does not significantly come into the signal energy band until the cable has become longer than 34 db. This is why a single zero hyperbolic equalizer can equalize cable up to 34 db loss fairly well.

The output signal from amplifier $A_3$ of circuit 18 is coupled to control circuit 10, which comprises a standard peak detector and integrator. Circuit 10 provides an output voltage $V_c$ proportional to the difference between the peak detected input signal level and the desired standard voltage transmit level, typically 1.5 volts peak. When the input signal to the control circuit 10 is at 1.5 volts the output voltage $V_c$ at 1.5 volts. As the output voltage $V_c$ varies, then the impedance of the FET's $Q_1$, $Q_2$ and $Q_3$ likewise varies until equalization is achieved. The lower the voltage $V_c$ is, the lower the impedance of the FET's and vice versa.

The details of the XMTR portion of the transceiver of FIG. 1 will now be explained. The control voltage $V_c$ is coupled from central circuit 10 to the gate electrode of FET $Q_4$ in Long Loop Detector (LLD) circuit 40. The function of the LLD circuit 40 is to energize switch SW1, which connects pre-equalizer 52 into the transmit patch, when the control voltage $V_c$ is sufficiently high as to indicate that the cable loss exceeds a predetermined value, i.e., 34 db. This, in turn, means that a cable of length/gauge in excess of 34 db loss, is coupled to the transceiver and that therefore pre-equalization is required in the transmit path in order to simulate a cable of less than 34 db loss, so that the equalization circuit of a receiver at the other end of the transmit path, which may only be capable of handling up to 34 db of signal loss, can accommodate the anticipated signal loss on the cable line.

The apparatus of LLD 40 comprises a pair of matched resistors $R_{10}$ and $R_{10}$, coupled at one end to a source of fixed DC potential $V_F$. The remaining end of $R_{10}$ is coupled to the plus input terminal of comparator 12 and the drain electrode of FET $Q_4$. The impedance $R_{Q4}$ of $Q_4$ is determined by $V_c$.

$R_{10}$ and $R_{Q4}$ thus form a voltage divider circuit providing one voltage signal to the plus terminal of voltage comparator 12. The negative input to comparator 12 is supplied by the voltage produced by the voltage divider circuit of $R_x$ and $R_{10}$, coupled to fixed voltage $V_F$.

Resistor $R_x$ is selected to have a fixed resistance equal to the resistance $R_{Q4}$ must assume for equalizing a 34 db loss cable. When $R_{Q4}$ exceeds $R_x$, the output of comparator 12 goes "High" energizing SW1 and connecting pre-equalizer 52 to Line Driver 60 in the transmit path. When $R_{Q4}$ is lower than $R_x$, indicating that a cable with a loss less than 34 db is connected to the transceiver, the output of comparator 12 is a "Low" and switch SW1 connects Line Driver 60 directly to Buffer 20 bypassing pre-equalizer 52.

Pre-equalizer 52 provides a transfer function characteristic having a fixed gain of G, a fixed pole at a frequency $f_p$ and a fixed zero at a frequency $f_z$.

The Gain G and the frequencies $f_p$ and $f_z$ can be computed in the following fashion. Using cable loss information, it is possible to determine the extra gain one must provide at different frequencies, so as to make the longest cable one must serve (transmit into) appear as a much shorter cable. More specifically, in the present case, a →bd loss cable is made to appear as a 34 db loss cable. In practice, this excess gain versus frequency function can be satisfactorily simulated using a fixed gain, a fixed zero and a fixed pole. In the present example of a 43 db pre-equalizer, good values are: a gain of 1.2; a fixed zero at 8 khz and a fixed pole at 24 KHz.

Having determined the pre-equalization needed for the maximum length cable, it is sufficient to fix the pre-equalizer at that value, even though the cable being served, though longer than 34 db, is not as long as the maximum length cable. This is acceptable in practice because the marginal loss for a cable with loss above a value of 34 db becomes constant for the next kilofeet i.e. the excess gain versus frequency requirement for every extra kilofoot becomes the same. The effect is that if the pre-equalizer is designed for loss $L_{max}$, say equal to 43 db, and if the cable is only of loss L, say 38 db, the receiving post-equalizer will think the loss is $34-(L_{max}-L)=29$ db. The receiving post-equalizer will then set its variables to equalize a cable of loss 29 db.

In the circuit of FIG. 1, the fixed zero is determined by capacitor C4 and Resistor R11 connected in parallel to Buffer 20 and is located at a frequency $F_2$ equal to $\frac{1}{2}\pi C4 (R_{12} // R_{11})$.

This completes the description of the transceiver of FIG. 1. It may be helpful, now, to include a brief description of the setting in which the pre- and post-equalizers 52 and 50 are intended to function. FIG. 3a shows a 4-wire full duplex extended range access system, in accordance with the invention, capable of signalling between two transceivers TR1 and TR2 via 4-wire lines 100A and 100B having up to 43 db loss, equivalent to up to 18 k feet of 26 gauge cable; and wherein one of the transceivers TR2 utilizes a standard BiQuad ACE equalizer 100 of the type described in U.S. Pat. No. 3,824,501 to Harris.

As may be seen in FIG. 3A, nodes A and B are in full duplex communication involving non-return to zero, (NRZ) signalling via four-wire communication lines wherein the transmit lines from node A to node B are the two wires labelled 100A and the receive lines for node A from node B are labelled 100B. The pulses are shaped to Nyquist pulses by conventional pre- and post-shapers, respectively labelled 90 and 88 in node A and 84 and 80 in node B. The function of the post-equalizer 50 is to compensate for the effect of the cable transfer function on the transmitted signal from the line driver 86 to the post shaper 88, which is primarily a deleterious frequency dispersion and signal loss effect.

The control voltage signal $V_c$ generated in the post-equalizer 50 is coupled to the pre-equalizer 52, as previously described, to either couple or uncoupled post-equalizer 52, depending upon the gauge size and cable length of two-wire pair 100A, so that the transmitted signal can be accommodated by the standard biquad ACE equalizer 82. The $V_c$ signal is proportional to cable loss. If the cable loss is above a predetermined value, the pre-equalizer circuit 52 is switched into the transmit path of node A prior to the driver circuit 60 to provide a fixed zero and a fixed pole at a predetermined frequency and a fixed gain at a predetermined value which simulates the transfer characteristics of a cable having a cable loss less than or equal to a value which the BAE 82 is capable of accepting.

In the apparatus of FIG. 3B, similar parts are similarly labelled. Again, node A and B are in full duplex communication, wherein AMI/NRZ input pulses are transmitted from node A to cable 100A to node B and similarly, AMI/NRZ pulses inputted to pre-shaper 90' of node B are transmitted over two wires 100B to pulse shaper 88 at node A. The difference between FIGS. 3A and 3B is that in node B, a post-equalizer and pre-equalizer of the invention is included so that the apparatus of the invention is included in both nodes. This system is capable of ultra extended range access performance and will accommodate up to 52 db of cable loss equivalent to 21,000 feet of 26 gauge wire, even though the pre-equalizers are only set to 43 db maximum cable loss.

The variable zero circuits of the invention are suitable for independent usage as bi-quad ACE equalizers and will therefore be described in greater detail in connection with FIG. 4A. The circuit of FIG. 4A essentially achieves a simple hyperbolic relationship between the frequency location of the zero and the gain of the circuit. However, it does so using only three transistors in an AC amplifier configuration, whereas the circuit described in the Harris patent requires multiple operational amplifiers (each having a large number of transistors) to achieve the same function. The present circuit of FIG. 4A saves not only in circuit complexity, but more importantly, on power consumption of the circuit.

Figure 4A:
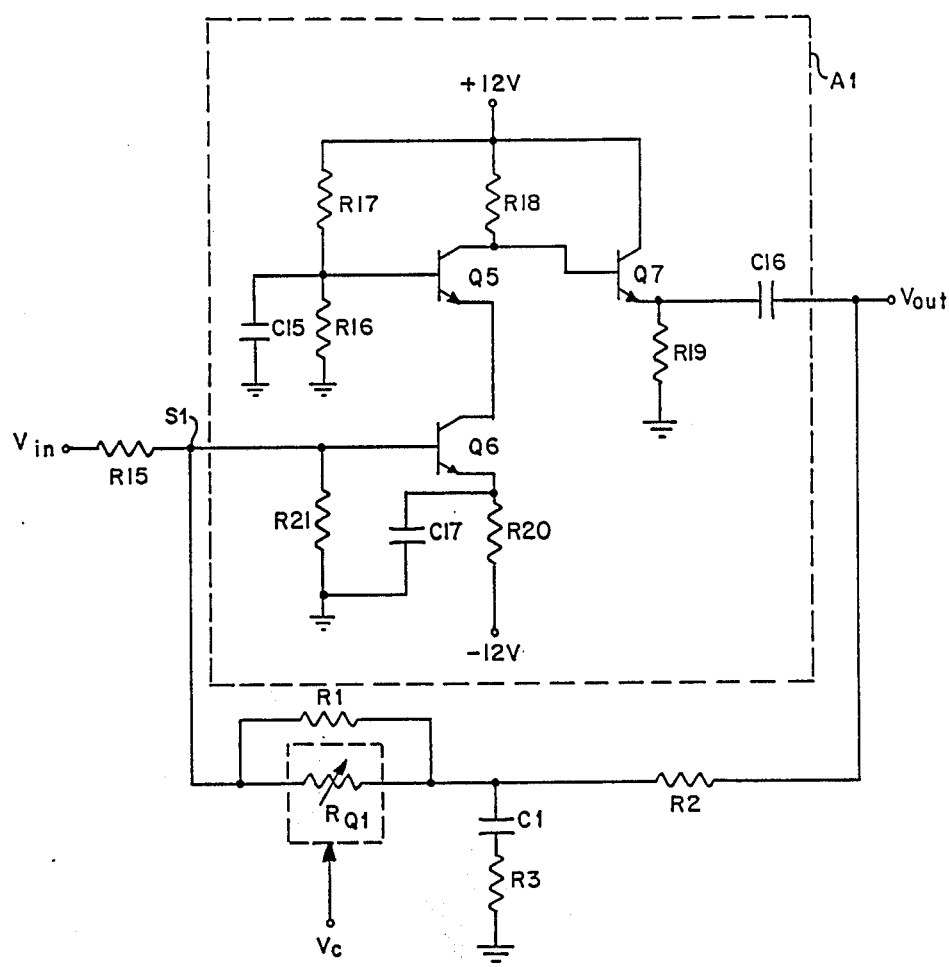
FIG. 4A is a schematic of a first real zero circuit in accordance with the invention.

In FIG. 4A, like items are labelled identical to items shown in the first variable zero circuit of post-equalizer 50 of FIG. 1. As may be seen in FIG. 4, the incoming voltage pulses from the cable have been pre-shaped by filter F1 of FIG. 1 and are inputted to input resistor $R_{15}$, which forms a summing node with resistor $R_1$ and variable resistance $R_{Q1}$ of FET $Q_1$ in parallel.

The output of the summing node $S_1$ is coupled to AC amplifier $A_1$, which comprises a pair of transistors $Q_5$ and $Q_6$ connected in cascode between +12 volts and −12 volts fed from respective biasing resistors $R_{18}$ and $R_{20}$. Resistors $R_{17}$, $R_{16}$ and $R_{17}$ and capacitor $C_{B2}$, as well as $R_{21}$ and capacitor $C_{17}$, provide appropriate biasing voltages to the cascode amplifier comprising transistors $Q_5$ and $Q_6$. Capacitor $C_{17}$ is chosen to be relatively very large, so that for frequencies in the bandwidth of the incoming signal $V_{in}$ capacitor $C_{17}$ is essentially a short to ground. Therefore, the pole produced by $R_{20}$ and capacitor $C_{17}$ is at a very low frequency relative to the energy content of the incoming signal $V_{in}$. This produces a very high gain amplification stage with essentially very little emitter resistance and a large collector resistance. The only thing limiting the gain is the intrinsic resistance of the emitter of transistor $Q_6$.

From an AC point of view, the gain of the cascode amplifier, $Q_5$ and $Q_6$, is the collector resistance divided by the emitter resistance. Since the emitter resistance is essentially zero because of the high value of capacitor $C_{17}$, the gain of the cascode stage approaches infinity. The gain is bounded because of the emitter resistance intrinsic to transistor $Q_6$.

Transistor $Q_7$ is an emitter follower stage that buffers the output of $Q_5$ from the effects of the feedback circuit. Capacitor $C_{16}$ is a very large coupling capacitor which has a capacitance such that relative to $CB_2$, it presents a very low effective impedance in the bandwidth of the signal. The feedback path comprising $R_2$, $C_1$, $R_3$ transistor $Q_1$ and resistor $R_1$ have been previously described in connection with FIG. 1.

Figure 4B:
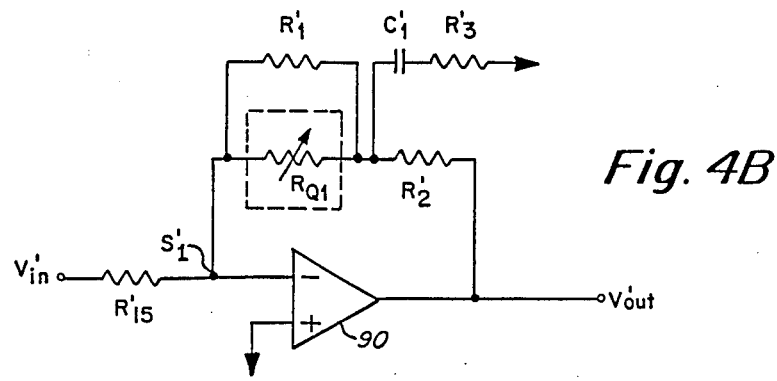
FIG. 4B is a schematic of an alternate embodiment of a real zero circuit in accordance with the invention.

FIG. 4B shows an alternate embodiment single OP-AMP realization of the hyperbolic gain/zero function. In FIG. 4B, parts identical to those in FIG. 4A carry identical labels with a prime suffix. Thus, the input voltage $V'_{in}$ is coupled to input resistor $R'_{15}$. $R'_1$ and $R_{Q1}$ are coupled in parallel to summing node $S'_1$ and $R'_{15}$ and the negative input terminal of a standard operational amplifier 90. The positive terminal of OP-AMP 90 is grounded, as shown. $C'_1$ and $R'_3$ are coupled in series between ground and $R'_2$ and $R'_1$, $R'_{Q1}$ in parallel. $R'_2$ is also connected to the juncture between $C'_1$ and $R'_1 /\!/ R'_{Q1}$ in the feedback path from the output of OP-AMP 90 to summer $S'_1$. Using standard OP-AMP analysis and ignoring stabilizing resistor $R'_3$, it can be shown that the transfer function T(s) from the input $V'_{in}$ to the output $V'_{out}$ is given by:

$$T(s) = k[(s/g)+1]$$

where:

$$k = k_{min}[1+\alpha]$$

$$g = g_{min}[1+1/\alpha]$$

and $$k_{min} - R'_2/R'_{15}$$

$$g_{min} - 1/(2\pi R'_2 C'_1)$$

and $$\alpha - (R'_{Q1} /\!/ R'_1)/R'_2 \approx R'_{Q1}/R'_2;$$

since $R'_1$ is very large. Noting the similarities to Equations 1 through 5, the hyperbolic nature of the circuit of FIG. 4B is illustrated.

EQUIVALENTS

This completes the description of the preferred embodiments of the invention. It is to be understood that these embodiments are illustrative of the principals of the invention and that modifications may be implemented by those skilled in the art without departing from the spirit and scope of this invention.

For example, while a 4-wire duplex transmission medium has been chosen to illustrate the embodiments of the invention, other transmission media, such as, two-wire, time-shared communication, as for example, in time compression multiplex systems, may be employed. Also, other pulse modulation systems, may be employed in place of AMI/NRZ, provided the peak level is well controlled.

Furthermore, the automatic equalizer of the invention, while illustrated in the context of digital data signalling is applicable to cable equalization for voice frequency transmission in which the standard fixed sealing current may be substituted for the peak voltage amplitude of the data signal for estimating loop length.

I claim:

1. Apparatus for equalizing the frequency and pulse response of a transmission cable comprising:
   (a) a first circuit means responsive to electrical pulse signals received from said cable for providing a transfer frequency and gain response to said signals, which response is characterized by a variable gain factor and at least two variable zero frequency locations to compensate said signals for signal losses over said cable; and
   (b) second circuit means for simultaneously adjusting said zero frequency locations and gain response, in accordance with the signal loss of said cable.

2. The apparatus of claim 1 further including filter means for pre-shaping said electrical signals and wherein said first circuit means includes first and second adjustable zero circuits each having an amplifier inverter stage and a summing node coupled to the input of the inverter stages and a feedback path from the output of the inverter stage to said summing node and wherein said pulse signals, after said pre-shaping, are coupled to said summing node of the first adjustable zero and the output of the inverter stage of the first adjustable zero circuit is coupled to the summing node of the second adjustable zero circuit.

3. The apparatus of claim 2 including a variable resistor in the feedback path and wherein said second circuit means generates a control voltage signal proportional to said cable loss which adjusts the impedance of said variable resistor in the feedback path of said amplifier inverter stage in each of said adjustable zero circuits.

4. The apparatus of claim 1 wherein the received electrical signals are originally transmitted over said cable at a standard voltage level and the second circuit detects the difference between the received compensated signal and the standard voltage level and generates a voltage difference signal proportional thereto which is coupled to said first circuit means to adjust said zero locations and gain response.

5. An automatic cable equalizer comprising:
   (a) a post-equalizer responsive to input pulse signals transmitted from a remote node over a cable for providing a variable gain transfer characteristic and at least two variable zero frequency location transfer characteristics to equalize said pulse signals by compensating for frequency dispersion and amplitude loss caused by said cable;
   (b) signal detection means for generating a control signal proportional to the difference between the signal as transmitted and the signal as equalized by said post-equalizer;
   (c) variable impedance means in said equalizer responsive to said control signal for simultaneously adjusting the gain and frequency locations of said post-equalizer.

6. The equalizer of claim 5 wherein the variable gain transfer characteristic reduces the gain when the signal loss in the cable is a low value.

7. The equalizer of claim 5 wherein the variable zero frequency locations are provided by first and second zero location circuits each having an amplifier inverter stage comprising an amplifier with a feedback path from the amplifier to a summing node coupled to the input of the amplifier and including voltage controlled impedances in said feedback path, said feedback path including a resistor capacitor network such that the gain of the stage is related to the zero location of the stage by a hyperbolic function.

8. The equalizer of claim 7 wherein the variable gain transfer characteristic is provided by a gain shaping circuit which reduces the gain when the cable has signal loss lower than a predetermined value.

9. An automatic cable equalizer system located at a proximate node comprising:
   (a) a post-equalizer responsive to a first set of input pulse signals transmitted from a first remote node over a first pair of wires of a first cable for providing a variable gain transfer characteristic and at least two variable zero frequency location transfer characteristics to equalize said pulse signal by compensating for frequency dispersion and amplitude loss caused by said wires;

(b) signal detection means for generating a control signal proportional to the difference between the signal as transmitted and the signal as equalized by said post-equalizer;

(c) variable impedance means in said equalizer responsive to said control signal for simultaneously adjusting the gain and frequency locations of said post-equalizer.;

(d) a pre-equalizer responsive to a second set of input pulse signals transmitted from a second remote node transmitted over a first pair of wires of a second cable for providing a predetermined gain and a zero and pole frequency characteristic to compensate said second set of input signals for the anticipated frequency dispersion and amplitude loss caused by transmission over wire having a loss greater than a predetermined value; and (e) detector means responsive to said control signal for coupling said pre-equalizer into the signal path of said first pair of wires of said second cable when the control signal indicates that the signal loss attributable to the first pair of wires of said first cable exceeds said predetermined value.

10. A bi-quadratic equalizer coupled to a summing node for providing a hyperbolic relation between the frequency location and gain of the equalizer comprising:

(a) an emitter follower transistor;

(b) a pair of transistors connected to form a cascade amplifier with the input of the amplifier connected to said summing node and the output coupled to said emitter follower transistor;

(c) a feedback path between the output of said emitter follower and said summing node; and (d) an R/C network and a variable impedance in the feedback path between the emitter follower and the summing node.

11. The equalizer of claim 10 wherein the variable impedance is provided by a voltage controlled transistor having a gate electrode adapted to be connected to a variable voltage source and the R/C network comprises a resistor $R_1$, a resistor $R_2$, a resistor $R_3$ and a capacitor $C_1$ and wherein $R_1$ is connected in parallel with the source and drain electrodes of said transistor and wherein the source electrode is connected to said summing node; $R_2$ is coupled in series between said drain electrode and the output of said emitter follower, and $C_1$ and $R_3$ are coupled in series between ground and said drain electrode.

12. In a communication node coupled to a full duplex pulse signal communication network having a receive path and a transmit path:

(a) a pre-equalizer circuit for providing a pole and zero frequency transfer characteristic and gain transfer characteristic; and (b) means coupling said circuit into the transmit path when the signal loss on the receive path exceeds a predetermined value.

13. Apparatus for signalling with pulse signals in a first direction over a first cable and for signalling with pulse signals in an opposite direction over a second cable having substantially equal cable signal loss as said first cable comprising:

(a) a pre-equalizer for providing amplitude and frequency compensation to pulse signals received from said first cable, said pre-equalizer being coupled to switch means which are adapted to couple or uncouple said pulse signals to said pre-equalizer in response to a signal proportional to the signal loss of said second cable.

14. The apparatus of claim 13 including a control circuit and a post-equalizer coupled to said second cable and wherein the signal proportional to signal loss is generated by said control circuit.

15. The apparatus of claim 14 wherein the signal proportional to signal loss is a voltage signal $V_c$ which is coupled to a detector circuit; said detector circuit comprising:

(a) a voltage comparator having two input terminals, and a pair of matched resistors coupled on one side to a fixed voltage and on the other side separately coupled to one of said input terminals of said voltage comparator; and (b) a voltage variable impedance coupled between one of said two input terminals and ground; and (c) a fixed resistor of known value coupled between the other of said two input terminals and ground; and (d) said voltage signal $V_c$ being coupled to said voltage variable impedance to vary said impedance such that when said variable impedance is below the value of the predetermined value of said fixed resistor, indicating that a relatively large signal loss has occurred in the second transmission medium, the voltage comparator produces an output signal of a first polarity causing the switch means to couple said pre-equalizer to said pulse input signals; and conversely, when said variable impedance is above the predetermined value of the said fixed resistor, indicating that a relatively small signal loss has occurred in the second transmission medium, the voltage comparator produces an output signal of a second polarity causing the switch means to uncouple said pre-equalizer from said pulse input signals.

16. A method for equalizing the pulse and frequency response of a transmission medium comprising the steps of:

(a) providing a transfer frequency and gain response to electrical analog or pulse signals received from said medium characterized by a variable gain and at least two variable zero frequency locations; and (b) simultaneously adjusting said zero frequency locations and gain response, in accordance with the signal loss of said medium.

17. The method of claim 16 wherein said adjustment is achieved by applying a control voltage signal, proportional to said signal loss, to voltage variable resistors in the feedback path of amplifier inverter stages providing said variable gain and two variable frequency locations.

18. In a post-equalizer responsive to input pulse signals transmitted from a remote node over a cable a method of automatic cable equalization comprising:

(a) providing a variable gain transfer characteristic and at least two variable zero frequency location transfer characteristics to equalize said pulse signals by compensating for frequency dispersion and amplitude loss caused by said cable; and (b) generating a control signal proportional to the difference between the signal as transmitted and the signal as equalized by said post-equalizer; and (c) simultaneously adjusting the gain and frequency locations of said post-equalizer.

19. The method of claim 18 wherein the variable gain transfer characteristic reduces the gain when the signal loss in the wire is below a predetermined value.

20. A method of automatic cable and equalization for pulse signals transmitted and received from communication nodes connected in 4-wire full duplex communication comprising the steps of:
(a) at a proximate node, providing a variable gain transfer characteristic and at least two variable zero frequency location transfer characteristics to equalize pulse signals received from a first remote node over a first pair of wires of a first cable;
(b) generating a control signal proportional to the difference between the signal as transmitted and the signal as equalized by said post-equalizer;
(c) simultaneously adjusting the gain and frequency locations in step (a) using said control signal;
(d) at said proximate node providing a predetermined gain and a zero and pole frequencies characteristics to compensate a second set of input signals from a second remote node transmitted over a first pair of wires of a second cable for frequency dispersion and amplitude loss caused by said wires coupling said pre-equalizer into the signal path of said first pair of wires of said second cable when the control signal indicates that the signal loss attributable to the first pair of wires of said first cable exceeds a predetermined value.

21. A method for equalizing signals in a communication node coupled to a full duplex receive path, transmit path pulse signal communication network comprising the steps of:
(a) providing a fixed pole and fixed zero frequency transfer characteristic and fixed gain transfer characteristic; and
(b) coupling said circuit into the transmit path when the signal loss on the receive path exceeds a predetermined value.

* * * * *